United States Patent [19]

Naruse et al.

[11] Patent Number: 4,860,663
[45] Date of Patent: Aug. 29, 1989

[54] APPARATUS FOR TRANSFERRING WORK PIECES BETWEEN STATIONS IN AN ASSEMBLY LINE

[75] Inventors: Kazuo Naruse, Okazaki; Hideaki Tobita, Toyota; Yoichi Shibata, Toyota, all of Japan

[73] Assignee: Toyota Jidosha Kabushiki Kaisha, Aichi, Japan

[21] Appl. No.: 127,120

[22] Filed: Dec. 1, 1987

[30] Foreign Application Priority Data

Jun. 8, 1987 [JP] Japan ................. 62-142874

[51] Int. Cl.4 ................. B61B 13/00; B65G 25/04
[52] U.S. Cl. .................. 104/162; 104/172.2; 198/803.01; 198/747
[58] Field of Search .............. 104/162, 165, 172.2; 198/747, 736, 803.01; 414/750

[56] References Cited

U.S. PATENT DOCUMENTS 3,798,981 3/1974 Richards et al. ............. 198/741 X
4,470,742 9/1984 Schindler ................. 198/465.1 X
4,597,709 7/1986 Yonezawa ................ 198/345 X
4,667,866 5/1987 Tobita et al. ............... 228/4.1

FOREIGN PATENT DOCUMENTS 48203 3/1982 Fed. Rep. of Germany ... 104/172.2

Primary Examiner—Robert B. Reeves
Assistant Examiner—Gary C. Hoge
Attorney, Agent, or Firm—Finnegan, Henderson, Farabow, Garrett & Dunner

[57] ABSTRACT

A transfer apparatus for transferring a plurality of workpieces has a pair of transfer rails along which run a plurality of jig pallets, each carrying a workpiece. A transfer bar is disposed between the pair of transfer rails so as to reciprocatingly move in the longitudinal direction of the rails. An engaging claw adapted to be driven up and down by a driving device is provided on the jig pallet, while a plurality of engaging blocks adapted to be engaged by the engaging claws are integrally provided on the transfer bar. The engaging claws are driven into and out of engagement with the corresponding engaging blocks so as to couple and uncouple the jig pallets and the transfer bar, whereby the jig pallets are transferred solely by linear motion of the transfer bar.

9 Claims, 5 Drawing Sheets

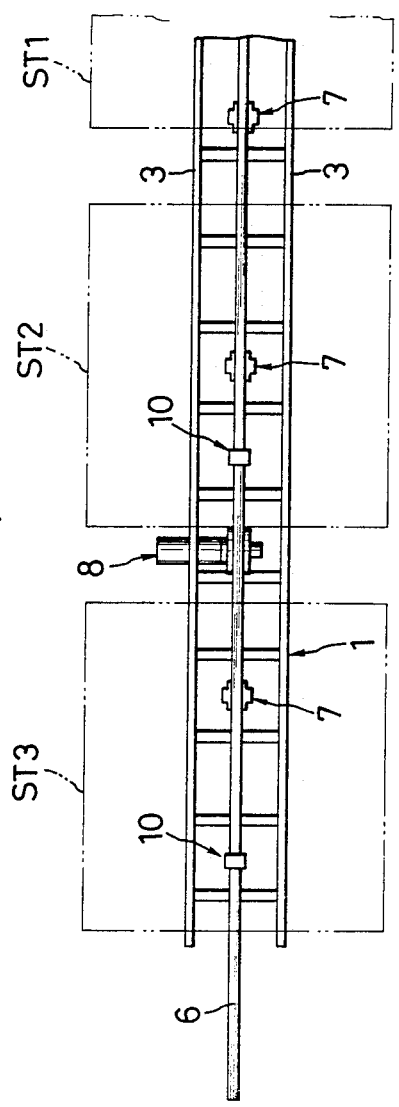
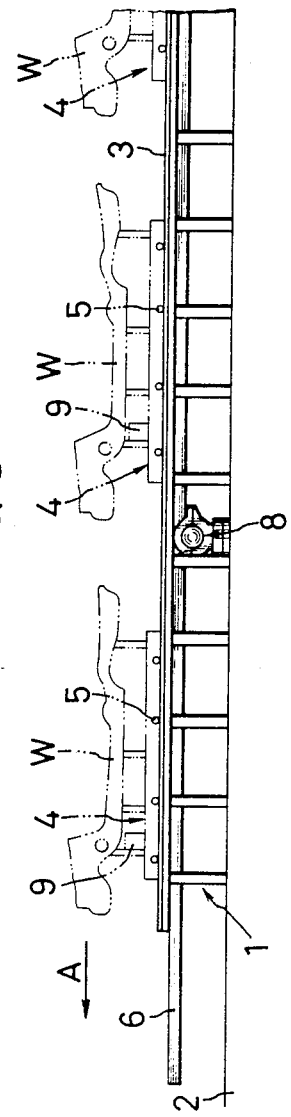

FIG. 8
FIG. 9
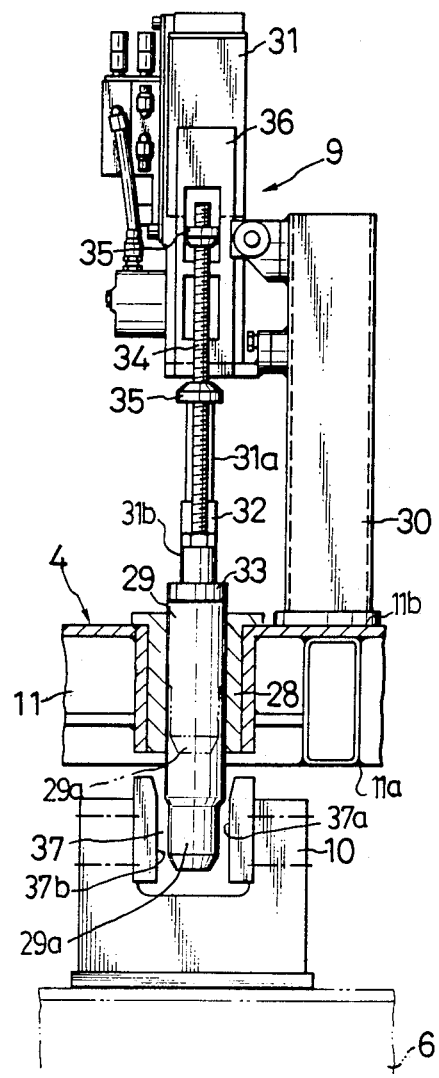
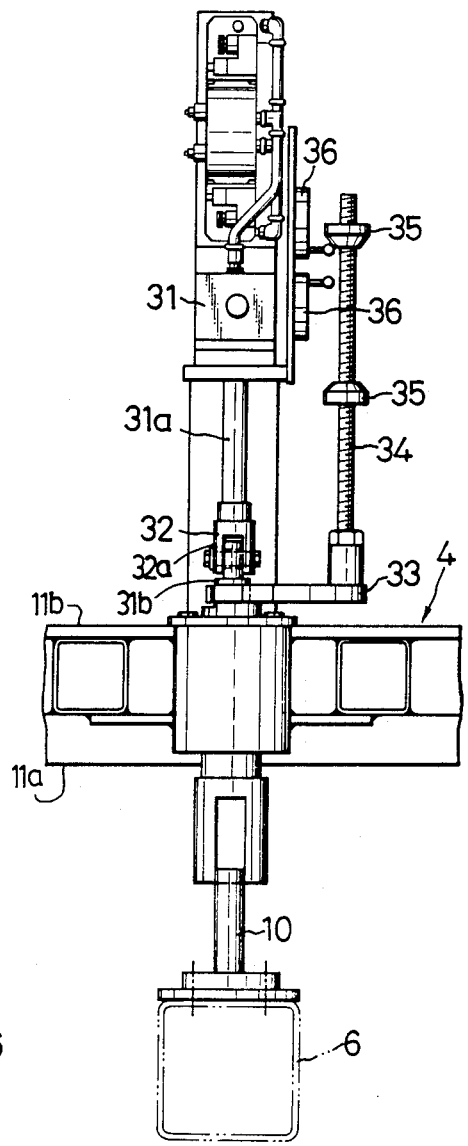

4,860,663

APPARATUS FOR TRANSFERRING WORK PIECES BETWEEN STATIONS IN AN ASSEMBLY LINE

FIELD OF THE INVENTION

The present invention relates to a transfer apparatus incorporating a transfer bar and, more particularly, to a transfer apparatus for transferring jig pallets on which are located and mounted workpieces.

DESCRIPTION OF THE PRIOR ART

Hitherto, assembly lines such as an automotive assembly line have been known in which works such as an under body, side body and so forth are located and mounted on jig pallets which are suitably brought into an assembly station where the assembly is conducted by making use of the jig pallets as the assembly jigs. This type of assembly line has been known from, for example, the specification of U.S. Pat. No. 4,667,866. Various types of systems are available for the purpose of transferring the jig pallets carrying these parts or works, such as shuttle transfer systems, truck transfer systems, top-chain transfer systems and slat conveyor systems. Among these transfer systems, the shuttle transfer system has been most welcomed because this ensures a high precision in locating the jig pallets with respect to the assembly station, as well as smooth movement of the jig pallets.

In general, the transfer apparatus of the shuttle transfer system incorporates a plurality of, typically two, transfer bars which are designed to perform box-type movement including upward stroking, forward stroking, downward stroking and backward stroking. These transfer bars are adapted to carry the jig pallet so as to transfer the jig pallet to a predetermined position in the assembly station.

The transfer apparatus of the shuttle transfer type, however, suffers from a problem in that the cycle time is elongated due to the necessity of the vertical upward and downward strokes in addition to horizontal movement, resulting in a difficulty in the improvement in the production efficiency. In addition, the upward and downward vertical strokes essentially require a specific link mechanism, as well as a supporting and guiding mechanisms, with the result that the size of the apparatus becomes large and the construction of the same becomes complicated.

SUMMARY OF THE INVENTION

Accordingly, an object of the present invention is to provide a transfer apparatus which is capable of transferring jig pallets mounting works to an assembly station without employing any vertical component of movement, i.e., only through linear movement.

To this end, according to the present invention, there is provided a transfer apparatus comprising: a pair of transfer rails mounting a plurality of jig pallets such that the jig pallets can run along these rails, each of the jig pallets carrying a workpiece to be processed; a transfer bar disposed between and extending along the pair of transfer rails in such a manner as to be movable reciprocatingly along the transfer rails; an engaging claw extending downwardly through each jig pallet so as to project downward therefrom; driving means on each jig pallet and adapted to vertically drive the engaging claw; and an engaging block integrally provided on the transfer bar and engageable with the engaging claw.

In this transfer apparatus, the driving means for vertically driving the engaging claw can have any suitable construction. For instance, the driving means may be constituted by a cylinder device, a rack-and-pinion system driven by a motor, or a ball screw mechanism. The engaging block adapted to be engaged by the engaging claw may be arranged in plural. Preferably, these sets are disposed at a pitch which corresponds to the pitch of the assembly stations or working stations along the production line.

In the apparatus of the present invention, by driving up and down the engaging claw on each jig pallet, it is possible to couple and uncouple the jig pallet and the transfer bar, so that the jig pallet can be transferred solely by the linear motion of the transfer bar. Since the movement of the transfer bars does not include any vertical stroke component, the cycle time is shortened so as to ensure a higher production efficiency. In addition, since the movement of the transfer bars is simplified, the construction of the apparatus is simplified and the installation cost is reduced advantageously.

BRIEF DESCRIPTION OF THE DRAWINGS

FIGS. 1 and 2 are a plan view and a side elevational view of the whole of a transfer apparatus in accordance with the present invention;

FIGS. 8 and 9 are side elevational views of coupling means for coupling the transfer bar and the jig pallet.

DESCRIPTION OF THE PREFERRED EMBODIMENT

Figure 3:
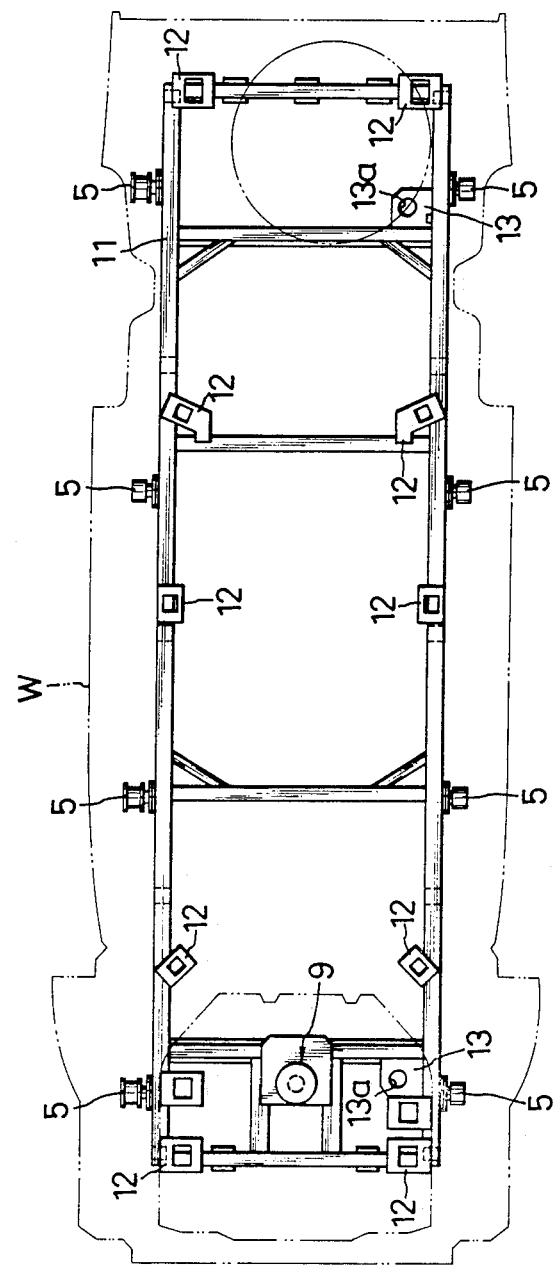
FIG. 3 is a plan view of a jig pallet which is adapted to be transferred by a transfer apparatus of the present invention.

A preferred embodiment of the present invention will be described hereinunder with reference to the accompanying drawings.

Referring first to FIGS. 1 and 2, a pair of transfer rails 3, 3 are laid on a plurality of columns 1 which are disposed on a floor 2 along an assembly line. The rails 3, 3 are arranged at both sides of the assembly line. A jig pallet 4 is adapted to run along the rails 3,3 by means of wheels 5. A workpiece w, which is in this case an under body of an automobile, is located on and carried by the jig pallet 4. Either the transfer rails 3 or the associated wheels 5 on the jig pallet have V-shaped surfaces which mate flat surfaces of the wheels 5 or the rails 3 so as to ensure that the jig pallet 4 can stably run along the rails 3, 3. A transfer bar 6 made of a tubular member having a substantially rectangular cross-section is laid along the assembly line in parallel with the transfer rails 3 at a position between the rails 3, 3. The transfer bar 6 is supported by a plurality of supporting guides 7 so as to be able to move linearly and is adapted to be reciprocatingly driven along the rails by the power of a driving source 8. A plurality of sets of disengageable coupling means, each constituted by an engaging device 9 and an engaging block 10, are arranged on the jig pallets 4 and the transfer bar 6, for the purpose of disengageably coupling the jig pallets 4 to the transfer bar 6. The arrangement is such that the coupling means selectively couples the jig pallets 4 to the transfer bar so that the jig pallets 4 are adapted to be moved along the transfer rails 3 following the movement of the transfer bar 6.

The assembly line has a plurality of assembly stations ST1, ST2 and ST3 having various devices such as a welding robot and locating devices. The jig pallets 4, as well as coupling means 9,10, are arranged at a pitch or interval corresponding to the pitch of the assembly stations ST1, ST2 and ST3. According to this arrangement, the jig pallets 4 are capable of moving in the direction of the arrow A along the transfer rails 3 by the operation of the coupling means, so as to be successively stationed in the assembly stations ST1, ST2 and ST3.

As shown in FIG. 3, the jig pallet 4 has a standard-shaped frame 11 commonly adaptable to a variety of types and models of automobile, and a plurality of reference members 12, 12 disposed on the frame 11, each of these reference members is adaptable to each specific type or model of the automobile. The frame 11 also carries a clamp device (not shown). The arrangement is such that the under body w can be located and mounted on the reference member 12. The jig pallet 4 also has a locating block 13 which is provided on the front and rear side thereof with reference holes 13a. The locating block 13 is adapted to be located with each assembly station ST1, ST2 or ST3 as the locating pins provided on the work stations as locating pins (not shown) provided in each of the assembly stations ST1, ST2 and ST3 are received in the reference holes 13a.

Figure 4:
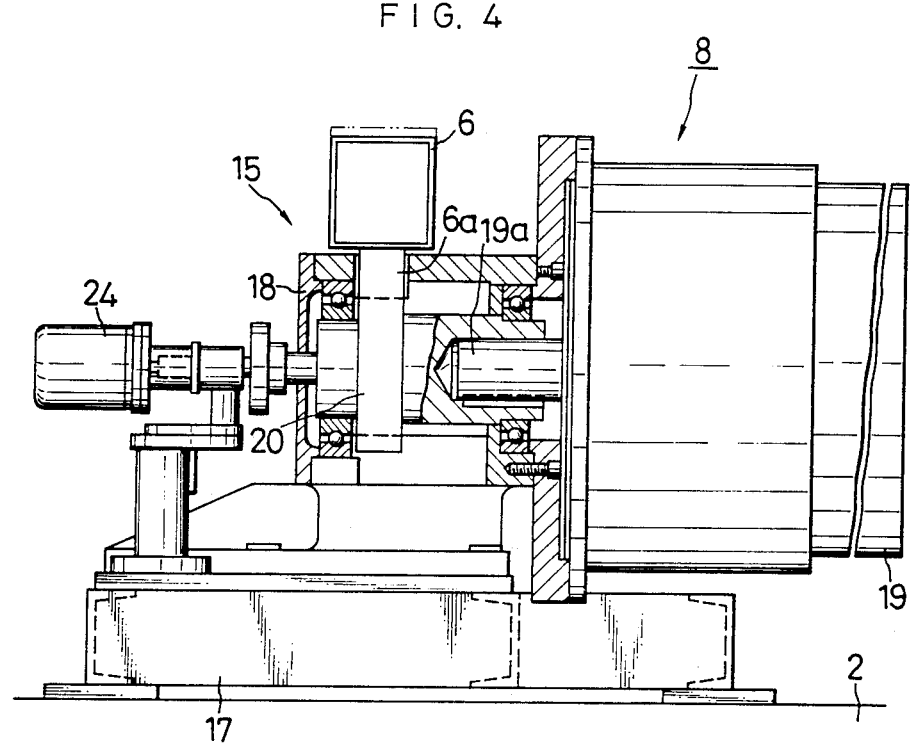
FIG. 4 is a sectional view of a driving portion of the transfer apparatus in accordance with the present invention.
Figure 5:
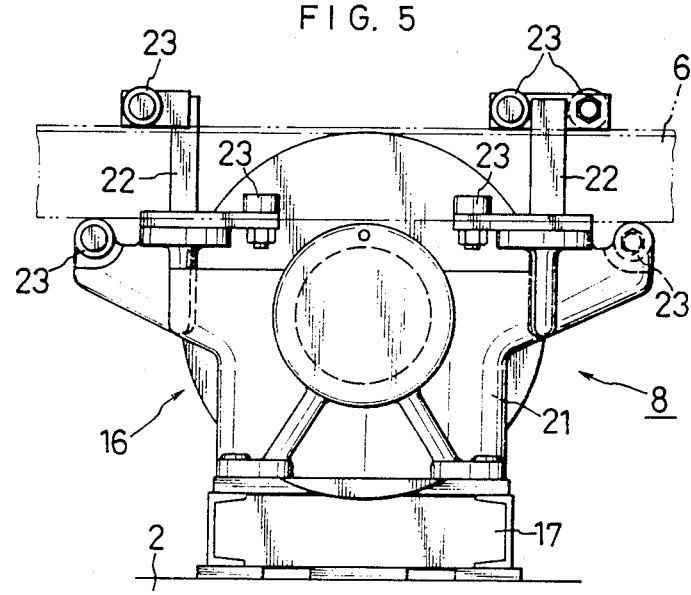
FIG. 5 is a front elevational view of the driving portion.
Figure 6:
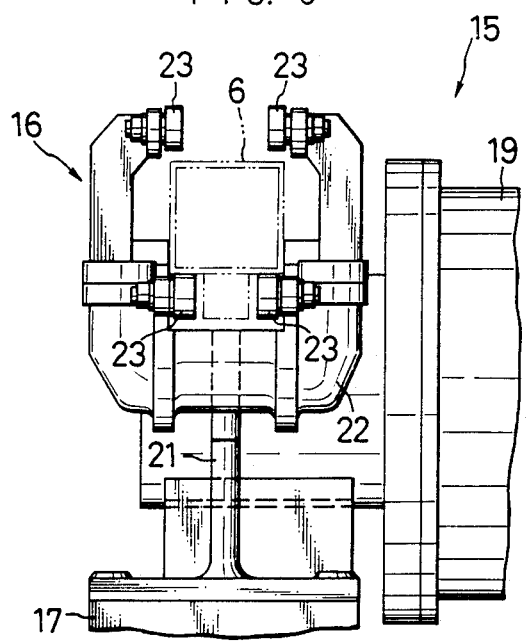
FIG. 6 is a side elevational view of the driving portion.

As will be also seen from FIGS. 4 to 6, the driving source 8 is mainly constituted by a driving portion 15 for driving the transfer bar 6 and a supporting portion 16 for supporting and guiding the transfer bar 6. The driving portion 15 includes a base 17 fixed to the floor 2, a housing 18 mounted on the base 17, a drive motor 19 connected to one end of the housing 18, a pinion 20 integrally fixed to the output shaft 19a of the drive motor 19 within the housing 18, and a rack 6a integral with the transfer bar 6 and meshing with the pinion 20. On the other hand, the supporting portion 16 has brackets 22, 22 provided on the front and rear sides of supporting posts 21 standing upright from the base 17, and a plurality of cam followers 23, 23 provided on the bracket 22 and engaging with the upper, lower and lateral sides of the transfer bar 6. The arrangement is such that the operation of the driving motor 19 is converted into a linear motion of the transfer bar 6 through the rack and pinion mechanism 20, 6a so that the transfer bar 6 makes a linear movement while being guided by the cam follower 23. The distance travelled by the transfer bar 6 is detected by a tachogenerator 24 provided in the driving section 15.

Figure 7:
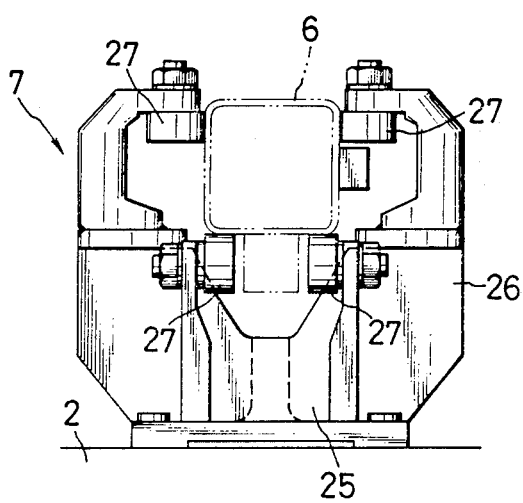
FIG. 7 is a side elevational view of a supporting guide for transfer bars incorporated in the transfer apparatus of the invention.

The supporting guide 7 also has a construction which is substantially the same as that of the supporting portion 16 of the driving source 8. More specifically, as shown in FIG. 7, the supporting guide 7 has a plurality of cam followers 27, 27 attached through brackets 26 to supporting posts 25 standing upright from the floor 2. These cam followers 27 make sliding contact with the lower surface and the lateral surfaces of the transfer bar 6 such as to ensure smooth movement of the transfer bar 6.

Referring now to FIGS. 8 and 9, the engaging device constituting a part of the coupling means for coupling the transfer bar 6 and the jig pallets 4 includes a cylindrical engaging claw 29 slidably received in a bushing 28 secured to a frame 11 of the jig pallet 4 and a cylinder 31 which is fixed to a supporting post 30 standing upright from the frame 11. As shown in FIG. 8, the internal diameter of the bushing is substantially equal to the portion of the external diameter of the claw member within the bushing when the claw member is in the engaging position. Claw member 29 also has a portion 29a of reduced diameter for insertion into slot 37. The cylinder 31 has an output shaft or rod portion 31a which is connected through a hinged joint 32, and pivotable about a horizontal axis defined by pin 32a, to the engaging claw 29, through another rod portion 31b such that the engaging claw 29 can be moved up and down through the frame 11 as a result of operation of the cylinder 31. Frame 11 has upper and lower surfaces 11a and 11b, and when claw 29 is retracted out of engagement with member 10, and portion 29a is above lower surface 11a as shown in FIG. 8. The engaging device 9 also has a dog shaft 34 standing on a bracket 33 extending laterally from the engaging claw 29, a pair of dogs 35, 35 attached to the dog shaft 34 at a suitable pitch, and a pair of limit switches 36, 36 provided on the mounting plate 36 such as to correspond to the dogs 35, 35. The arrival of the engaging claw at its lower or upper stroke end is detected by engagement between one of the dogs 35, 35 with the adjacent one of the limit switches 36, 36.

As will be seen from FIGS. 8 and 9, the block 10 which also constitutes a part of the coupling means has an engaging slot 37 defined by spaced walls 37a and 37b, having surface portions which slant outwardly from each other vertically at their upper ends. for receiving the engaging claw 29. The walls defining engaging slot 37 extend in a direction perpendicular to the direction of movement of the transfer bar 6. so that, when the engaging claw 29 is received in the engaging slot 37, the jig pallet 4 and the transfer bar 6 are prevented from moving relative to each other in the direction of transfer. Signals from the limit switches 36, 36 and the signal from the tachogenerator 24 of the driving source 8 are sent to a separately mounted programmable controller PC, and the transfer device of the present invention is generally controlled by the programmable controller PC.

A plurality of jig pallets 4, each carrying a piece of under body w located thereon, are fed onto the transfer rails 3 and the cylinder 31 on each jig pallet 4 is activated to lower the engaging claw 29 thereby causing the engaging claw to engage with corresponding engaging block on the transfer bar, thereby coupling each jig pallet 4 to the transfer bar 6, as shown in FIGS. 8 and 9. Then, as the transfer bar 6 is moved forward by the operation of the driving motor 19, the jig pallets 4 are tracted by the transfer bar 6 so as to move along the transfer rails 3 so as to be brought into the respective assembly stations ST1, ST2 and ST3. More specifically, the engaging devices 9, i.e., cylinders 31, corresponding to the respective assembly stations ST1, ST2 and ST3 are activated so that the jig pallets 4, 4 are brought into the respective assembly stations (see FIGS. 1 and 2).

The forward movement of the transfer bar 6 is stopped when the jig pallets 4, 4 have been set in right positions in the respective assembly stations ST1, ST2 and ST3. Subsequently, the engaging claws 29 are moved upward by the operation of the cylinders 31 so as to disconnect the jig plates 4 from the transfer bar 6. Immediately after the disconnection, the driving motor 19 operates to reverse only the transfer bar 6 to the initial position. Meanwhile in each of the assembly stations ST1, ST2 and ST3, locating pins are inserted into holes in the locating block 13 so as to locate and fix the jig pallet 4 with respect to the assembly station, thereby enabling the necessary assembly operation such as welding by a robot to be conducted on the work carried by the jig pallet 4. After the completion of the assembly operations in the respective assembly stations, the cylinders 31 are activated and the driving motor 19 is restarted so that the jig pallets 4 are transported into the next assembly stations ST1, ST2 and ST3. The described operations are repeated so that each workpiece w, which is a piece of under body in this embodiment, undergoes a series of assembly operations.

In the described embodiments, a coupling means 9, 10 is provided for each of the assembly stations ST1, ST2 and ST3, so as to selectively couple the jig pallet to the transfer bar 6, so that the transfer of the jig pallets 4 can be conducted only between the assembly stations which require such transfer of workpieces. For instance, the assembly line can operate satisfactorily even when one of the jig pallets is omitted from the train of the jig pallets.

What is claimed is:

1. Apparatus for transferring workpieces between spaced work stations, comprising:
   a pair of elongated rails connecting at least two work stations;
   a jig pallet having a frame for holding a workpiece, the jig pallet being movably mounted on said pair of rails;
   an elongated transfer bar reciprocably mounted adjacent to and extending longitudinally along said pair of rails below said mounted pallet;
   at least one blocking member fixedly attached to and movable with said transfer bar, said at least one blocking member having a portion extending upwardly substantially perpendicular to the longitudinal extent of the transfer bar;
   the jig pallet including a support member mounted to the frame and disposed above the pallet, bearing means having a central axis perpendicular to and aligned with the transfer bar during movement of the jig pallet along the rails, said bearing means being open at opposite ends in communication above and below the pallet frame;
   a claw member having a central axis slidably mounted axially in said bearing means;
   said claw member extending into the bearing means and extending below the pallet frame into abutting engagement with the blocking member when in a first position and in the bearing means out of engagement with and spaced above the blocking member when in a second position; and
   claw member driving means, including a piston cylinder assembly mounted on said support member above the frame and a piston rod means connecting the piston and claw member, for operating the claw member selectively, to the first and second position.

2. The apparatus of claim 1, wherein the at least one blocking member includes a plurality of blocking members spaced from each other a distance corresponding to the space between stations along the rails.

3. The apparatus of claim 1, wherein the at least one blocking member includes a slot having spaced walls in the longitudinal direction of the transfer bar and extending in a plane substantially perpendicular to the length dimension of the transfer bar.

4. The apparatus of claim 3, wherein the claw member is cylindrical in configuration and dimensioned to slidably fit in the slot at times when the bearing means is longitudinally positioned above the blocking member.

5. The apparatus of claim 1, wherein the piston rod means connecting the piston and claw member includes a first rod portion hingedly connected intermediate the claw member and the piston to a second rod portion, said hinged connection being pivotable about a horizontal axis that extends substantially perpendicular to the axis of the first and second piston rod portions and perpendicular to the longitudinal dimension of the transfer bar.

6. The apparatus of claim 5, wherein the bearing means includes a bushing having an internal diameter substantially equal to an external diameter of the portion of the claw member within the bearing member at times when the claw member is in the first position.

7. The apparatus of claim 1, wherein the frame of the jig pallet has upper and lower surfaces and the claw member is positioned above the lower surface of the jig pallet when in the second position.

8. The apparatus of claim 4, wherein the claw member has a portion of reduced diameter adjacent the end opposite the connecting rod for insertion into the slot of the blocking member.

9. The apparatus of claim 3, wherein the spaced walls have opposing surface portions that slant outwardly from each other vertically toward the upper ends of the slot.

* * * * *